United States Patent
Gorres

(10) Patent No.: US 7,476,438 B2
(45) Date of Patent: Jan. 13, 2009

(54) MODIFIED SELF-ADHERENT WRAP

(76) Inventor: Geoffrey H. Gorres, 279 Plymouth St., Amery, WI (US) 54001

(*) Notice: Subject to any disclaimer, the term of this patent is extended or adjusted under 35 U.S.C. 154(b) by 0 days.

(21) Appl. No.: 10/571,188

(22) PCT Filed: Sep. 10, 2004

(86) PCT No.: PCT/US2004/029706

§ 371 (c)(1),
(2), (4) Date: Dec. 7, 2006

(87) PCT Pub. No.: WO2005/027780

PCT Pub. Date: Mar. 31, 2005

(65) Prior Publication Data

US 2007/0082569 A1   Apr. 12, 2007

Related U.S. Application Data

(60) Provisional application No. 60/502,816, filed on Sep. 12, 2003.

(51) Int. Cl.
B32B 3/00       (2006.01)
B32B 7/12       (2006.01)
B32B 15/04      (2006.01)
B32B 27/14      (2006.01)

(52) U.S. Cl. .................... 428/221; 428/196; 428/542.6; 428/919; 442/123

(58) Field of Classification Search .................. 428/919, 428/196, 221, 542.6; 442/123, 126, 182
See application file for complete search history.

(56) References Cited

U.S. PATENT DOCUMENTS

| | | | |
|---|---|---|---|
| 2,351,142 A | | 6/1944 | Mitchell |
| 2,364,289 A | | 12/1944 | Hale |
| 3,575,782 A | | 4/1971 | Hansen |
| 4,005,709 A | | 2/1977 | Laerdal |
| 4,095,940 A | | 6/1978 | Weingarten |
| 4,243,709 A | | 1/1981 | Morton |
| 4,308,168 A | | 12/1981 | Sato et al. |
| 4,837,056 A | | 6/1989 | Easley |
| 4,984,584 A | | 1/1991 | Hansen et al. |
| 5,010,589 A | * | 4/1991 | Hamilton ............... 2/1 |
| 5,066,529 A | | 11/1991 | Huber et al. |
| 5,090,149 A | | 2/1992 | Muk Kim |
| 5,139,700 A | | 8/1992 | Miksic et al. |
| 5,422,187 A | | 6/1995 | Miksic et al. |
| 5,742,985 A | | 4/1998 | Larrabee |
| 5,773,101 A | | 6/1998 | Sanders |
| 5,939,339 A | | 8/1999 | Delmore et al. |
| 6,033,599 A | | 3/2000 | Lozano et al. |
| 6,520,876 B1 | | 2/2003 | Eastman, II |
| 6,589,297 B2 | | 7/2003 | Mach et al. |
| 6,616,387 B2 | | 9/2003 | Schneider et al. |
| 2002/0152559 A1 | | 10/2002 | Muirhead |

* cited by examiner

*Primary Examiner*—Jenna-Leigh Johnson
(74) *Attorney, Agent, or Firm*—Fish & Richardson P.C.

(57) ABSTRACT

The invention provides a self-adherent wrap containing a camouflage pattern and/or an active agent, as well as methods of making and using such self-adherent wraps.

23 Claims, 2 Drawing Sheets

MODIFIED SELF-ADHERENT WRAP

CROSS-REFERENCE TO RELATED APPLICATIONS

This application is a National Stage application under 35 U.S.C. §371 and claims benefit under 35 U.S.C. §119(a) of International Application No. PCT/US2004/029706 having an International Filing Date of Sep. 10, 2004, which claims the benefit of priority under 35 U.S.C. §119(a) of U.S. application Ser. No. 10/808,937 having a filing date of Mar. 25, 2004, which claims the benefit of priority under 35 U.S.C. §119(e) of U.S. Application No. 60/502,816, filed Sep. 12, 2003. The disclosures of the prior applications are incorporated by reference in their entirety.

TECHNICAL FIELD

This invention relates to a self-adherent wrap, and more particularly to a self-adherent wrap comprising a camouflage pattern and/or an active agent.

BACKGROUND

Self-adherent wraps are typically used for bandaging. They serve to hold bandaging in place, support sprains, as temporary splints, by providing joint support, to reduce edema, and to restrict movement. These self-adherent wraps are generally washable and reusable.

SUMMARY

The present invention provides a modified self-adherent wrap. The present invention also provides methods of making a modified self-adherent wrap of the invention as well as methods of using such a modified self-adherent wrap.

In one aspect, the invention provides a wrap comprising a camouflage pattern applied thereon, wherein the wrap is a self-adherent wrap. Generally, the wrap does not adhere to an object to which the wrap is applied. Representative objects include a gun, a bow, a knife, a body part, a flashlight, a water bottle, a portion of a hunting blind or stand, boots, a backpack, a camera, a radio, a walkie-talkie, a two-way radio, a global positioning system (GPS), or a vehicle.

In some embodiments, the camouflage pattern is applied to the wrap before the wrap is applied to an object or after the wrap has been applied to an object. In some embodiments, the wrap is reusable. In certain embodiments, the camouflage pattern is applied to one side of the wrap, or both sides of the wrap. For example, a different camouflage pattern can be printed on each side of the wrap.

Representative camouflage patterns include palmetto, treebark, hardwoods, hardwoods snow, timber, wetlands, mossyoak, forest floor, shadowgrass, fall foliage, breakup, mottled, and striped, and can be made from any color including green, gray, brown, yellow, red, black, and white. In certain embodiments, the camouflage pattern can be three-dimensional.

In addition to the camouflage pattern, wraps of the invention also can include one or more active agents such as a corrosion preventing compound, one or more compounds that provide an anti-UV coating, one or more compounds that provide an infrared detection deterrent coating, one or more compounds having an odor, one or more compounds that block odors, paint thinner, turpentine, a dessicant, insect repellent, one or more anti-fungal compounds, and/or one or more anti-bacterial compounds. Representative corrosion preventing compounds include wax, grease, varnish, silicone, silica gel, a vapor phase corrosion inhibitor (VPCI), and a volatile corrosion inhibitor (VCI).

In another aspect, the invention provides methods of removably camouflaging an object. Such methods includes providing an object; and applying a wrap to the object, wherein the wrap is a self-adherent wrap, wherein the wrap comprises a camouflage pattern applied thereon. Generally the wrap does not adhere to the object to which it is applied. Representative objects include a gun, a bow, a knife, a body part, a flashlight, a water bottle, a portion of a hunting blind or stand, boots, a backpack, a camera, a radio, a walkie-talkie, a two-way radio, a global positioning system (GPS), and a vehicle.

In some embodiments, the methods can further include removing the wrap from the object, and may also include reapplying the wrap to the object or to a different object.

In another aspect, the invention provides methods of removably camouflaging an object. Such methods include providing an object; and applying a wrap to the object, wherein the wrap is a self-adherent wrap, wherein the wrap comprises a camouflage pattern applied thereon. It is a feature of the invention that applying the wrap does not require pre-treatment of the object. The methods further can include removing the wrap. It is a feature of the invention that removal of the wrap from the object does not require use of a release agent.

In yet another aspect, the invention provides methods of making a camouflage wrap. Such methods include providing a wrap, wherein the wrap is a self-adherent wrap; and applying a camouflage pattern thereon. Representative camouflage patterns include palmetto, treebark, hardwoods, hardwoods snow, timber, wetlands, mossyoak, desert, forest floor, shadowgrass, fall foliage, breakup, mottled, and striped. In certain embodiments, the camouflage pattern is applied to the wrap by a manufacturer of the wrap. In other embodiments, the camouflage pattern is applied to the wrap by an end-user of the wrap.

In one aspect, the invention provides a wrap comprising an active agent, wherein the wrap is a self-adherent wrap. Generally, active agent is a protective agent, a destructive agent, or a restorative agent. Typically, the wrap does not adhere to an object to which the wrap is applied. Representative objects include, but are not limited to, a gun, a bow, a knife, a body part, a flashlight, a water bottle, a portion of a hunting blind or stand, boots, a backpack, a camera, a fishing rod, a fishing reel, a fishing tackle box, snow skis, snowboards, a radio, a walkie-talkie, a two-way radio, a global positioning system (GPS), and a vehicle.

In certain embodiments, the active agent can be applied to the wrap before the wrap is applied to an object. In other embodiments, the active agent can be applied to the wrap after the wrap has been applied to an object. In some embodiments, the active agent is applied to one side of the wrap, while in other embodiments, the active agent is applied to both sides of the wrap. Generally, a wrap of the invention is reusable.

Representative active agents include a corrosion preventing compound, one or more compounds that provide an anti-UV coating, one or more compounds that provide an infrared detection deterrent coating, one or more compounds having an odor, one or more compounds that block odors, paint thinner, turpentine, a dessicant, insect repellent, one or more anti-fungal compounds, and/or one or more anti-bacterial compounds. Representative corrosion preventing compounds include wax, grease, varnish, silicone, silica gel, a vapor phase corrosion inhibitor (VPCI), and a volatile corrosion inhibitor (VCI).

A wrap of the invention containing an active agent also can have a camouflage pattern applied thereon. Representative camouflage patterns include palmetto, treebark, hardwoods, hardwoods snow, timber, wetlands, mossyoak, forest floor, shadowgrass, fall foliage, breakup, mottled, and striped.

In another aspect, the invention provides methods of removably wrapping an object. Such methods include providing an object; and applying a wrap to the object, wherein the wrap is a self-adherent wrap, wherein the wrap comprises an active agent. Generally, the wrap does not adhere to the object. Methods of the invention can further include removing the wrap from the object, and additionally can include reapplying the wrap to the object or to a different object.

Representative objects include, without limitation, a gun, a bow, a knife, a body part, a flashlight, a water bottle, a portion of a hunting blind or stand, boots, a backpack, a camera, a fishing rod, a fishing reel, a fishing tackle box, snow skis, snowboards, a radio, a walkie-talkie, a two-way radio, a global positioning system (GPS), and a vehicle. Representative active agents include a corrosion preventing compound, one or more compounds that provide an anti-UV coating, one or more compounds that provide an infrared detection deterrent coating, one or more compounds having an odor, one or more compounds that block odors, paint thinner, turpentine, a dessicant, insect repellent, one or more anti-fungal compounds, and/or one or more anti-bacterial compounds. Representative corrosion preventing compounds include wax, grease, varnish, silicone, silica gel, a vapor phase corrosion inhibitor (VPCI), and a volatile corrosion inhibitor (VCI).

In still another aspect, the invention provides methods of removably wrapping an object. Such methods include providing an object; and applying a wrap to the object, wherein the wrap is a self-adherent wrap, wherein the wrap comprises an active agent. It is a feature of the invention that applying the wrap to an object does not require pretreatment of the object. It also is a feature of the invention that removal of the wrap from the object does not require use of a release agent.

In still another aspect, the invention provides methods of making a wrap comprising an active agent. Such methods include providing a wrap, wherein the wrap is a self-adherent wrap; and applying an active agent thereon. Application of the active agent can be performed by a manufacturer of the wrap, or by an end-user of the wrap. In some embodiments, the active agent is applied on the surface of the wrap, by impregnating the wrap with the active agent, and/or is applied in layers.

Representative active agents include a corrosion preventing compound, one or more compounds that provide an anti-UV coating, one or more compounds that provide an infrared detection deterrent coating, one or more compounds having an odor, one or more compounds that block odors, paint thinner, turpentine, a dessicant, insect repellent, one or more anti-fungal compounds, and/or one or more anti-bacterial compounds. Representative corrosion preventing compound is one or more agents selected from the group consisting of wax, grease, varnish, silicone, silica gel, a vapor phase corrosion inhibitor (VPCI), and a volatile corrosion inhibitor (VCI).

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In addition, the materials, methods, and examples are illustrative only and not intended to be limiting. All publications, patent applications, patents, and other references mentioned herein are incorporated by reference in their entirety. In case of conflict, the present specification, including definitions, will control.

The details of one or more embodiments of the invention are set forth in the accompanying drawings and the description below. Other features, objects, and advantages of the invention will be apparent from the drawings and detailed description, and from the claims.

DETAILED DESCRIPTION

Figure 1:
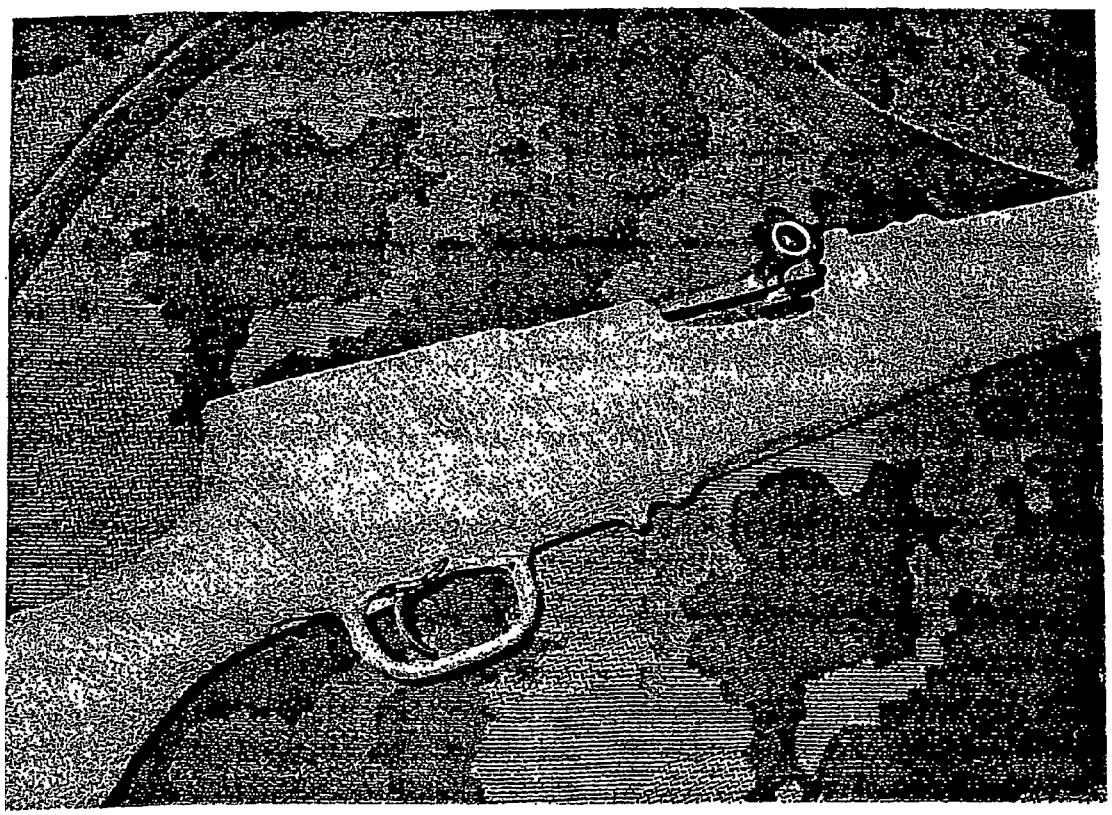
FIG. 1 shows the ability of a self-adherent wrap of the invention to cover small details, such as trigger guards on firearms, while at the same time accommodating the functional portions (e.g., leaving the bolt uncovered).

The present invention provides a self-adherent wrap containing either or both a camouflage pattern and an active agent. A wrap of the invention advantageously does not require a pretreatment to apply and does not require use of a release agent for removal. The present invention further provides methods of making and using a self-adherent wrap containing a camouflage pattern and/or an active agent.

Self-Adherent Wrap

By definition, self-adherent wraps suitable for use in the invention do not adhere to the skin or to the substrate or object to which they are applied, and do not require the use of fasteners. A self-adherent wrap suitable for use in the invention cohesively bonds to itself with sufficient force to hold the contacting layers together against reasonably high shearing stresses. A self-adherent wrap suitable for use in the invention can be, without limitation, elastic, conformable, and/or porous.

Any wrap that is self-adherent is suitable for use in the invention. Commercially available examples of self-adherent wraps suitable for use in the present invention include woven wraps such as COBAN self-adherent wrap (3M, St. Paul, Minn.), CUTTER-WRAP self-adhesive bandage (Cutter Animal Health, Miles Laboratories, Inc., Shawnee Kans.), MEDI-RIP self-adherent bandage (Conco Medical Company, Bridgeport, Conn.), and SELF-GRIP sports/tape bandage (LMA, Ltd., South Norwalk, Conn.) and non-woven bandages such as ROFLEX cohesive flexible bandage (Smith and Nephew Rolyan Inc., Menomonee Falls, Wis.), VET-FLEX Veterinary flexible bandage (The Butler Company, Columbus, Ohio), CO-FLEX cohesive flexible bandage (Andover Coated Products, Inc., Marblehead, Miss.), FLEXUS support wrap (Kimberly-Clark Corporation Animal Care Division, Roswell, Ga.), and EQUISPORT equine support bandage (3M, St. Paul, Minn.). Methods and materials for manufacturing a self-adhesive wrap suitable for use in the invention are known and described in for example, U.S. Pat. Nos. 3,575,782; 4,005,709; 4,984,584; 5,939,339; and 6,616,387, herein incorporated by reference in their entirety.

Active Agents

Self-adherent wraps suitable for use in the invention can contain an active agent. An active agent can include, for example and without limitation, a protective agent, a destructive agent, or a restorative agent. Protective agents can be used to protect the wrapped object from damage or from the elements; destructive agents can be used to remove material from the object; and restorative agents can be used to restore the object. The following examples are representative and in no way limit the particular active agents that can be incorporated into a suitable self-adherent wrap.

Representative protective agents that can be used in a suitable self-adherent wrap include, for example, corrosion preventing compounds such as WD-40, wax, grease, varnish, silicone, silica gel, a vapor phase corrosion inhibitor (VPCI), or a volatile corrosion inhibitor (VCI). VPCIs and VCIs are disclosed in U.S. Pat. Nos. 5,139,700, 6,033,599, 5,422,187, and 4,308,168. Additional protective agents include compounds, for example, that provide an anti-UV coating or that act as a dessicant. Representative destructive agents that can be used in a suitable self-adherent wrap include, for example, paint stripper or turpentine for removing stain or varnish. Representative restorative agents that can be used in a suitable self-adherent wrap include, for example, wax, grease, stain, or varnish.

Any number of other active agents can be used with a suitable self-adherent wrap. For example, a wrap can contain an infrared detection deterrent coating, a compound having a particular odor or scent (e.g., doe urine, or doe estrus), or a compound that blocks odors and scents (e.g., activated charcoal). In addition, a suitable self-adherent wrap can contain insect repellant; or one or more anti-fungal or anti-bacterial compounds to fight infection.

Camouflage and Camouflage Patterns

The purpose of camouflage is to help on object blend into the environment. Camouflage works because it creates visual confusion. Camouflage does not make an object or an individual invisible; it simply disguises the recognizable form by breaking up the outline. This visual confusion is created by both shape and color in the camouflage. The overall camouflage pattern consists of contrasting areas of different hues and shapes. Even for animals without acute color vision such as deer and elk, the irregular pattern of different shades and shapes breaks up the outline of an object or individual. The use of natural earth-tone colors produces a camouflage pattern that is effective for color-seeing animals such as wild turkeys without any loss of camouflage effectiveness for deer or elk. Counter-shading technology increases both shape and color contrast that enhances the effect of the camouflage by producing a three-dimensional effect and creating a third element of visual confusion. Camouflage products are used routinely by the military, police, outdoor enthusiasts, hunters, and wildlife researchers and photographers.

A variety of different colors and patterns can be applied to a sutiable self-adherent wrap to produce a camouflage pattern. For example, and without limitation, greens, yellows, and reds can be used to produce a vegetation camouflage pattern; grays and browns can be used to produce a hardwood camouflage pattern; yellows and browns can be used to produce a wetland, marsh, corn and/or wheat crop, or natural grassland camouflage pattern; and browns, blacks, whites, and grays can be used to produce a desert or arid environment camouflage pattern.

Representative camouflage patterns are known and can include one or more of the following general patterns: palmetto, treebark, hardwoods, hardwoods snow, timber, wetlands, mossyoak, forest floor, shadowgrass, fall foliage, breakup, mottled, and striped. U.S. Pat. Nos. D309,380; D324,312; D332,179; D366,154; D474,613; and D474,897 describe specific camouflage patterns. Camouflage patterns are often mixed. For example, when turkey hunting, a camouflage pattern appropriate for leaning against a tree can be worn from the waist up, while a camouflage pattern appropriate for sitting on a forest floor can be worn from the waist down.

Methods of Making and Using a Wrap of the Invention

A self-adherent wrap of the invention can be used to removably wrap an object, usually for the purposes of concealment, protection, destruction, and/or restoration. Without limitation, it is envisioned that a self-adherent wrap of the invention would be particularly useful to sportspersons and military personnel. A representative, although not comprehensive, list of objects that can be removably wrapped with a self-adherent wrap of the invention includes guns, bows, knives, flashlights, water bottles, portions of hunting blinds or stands, boots, backpacks or hip packs, cameras and tripods, phones and electronics (e.g., radios, walkie-talkies, two-way radios, a global positioning systems (GPS), and cell phones), fishing equipment (e.g., rods, reels, and tackle boxes), other sporting equipment (e.g., skis and snowboards), and portions of a vehicle (e.g., automobiles or trucks, all-terrain vehicles (ATVs) and boats). Body parts, including hands, fingers, arms, the neck, and the face, also can be removably wrapped using a self-adherent wrap of the invention. Significantly, a self-adherent wrap of the invention can be easily removed from an object, and if so desired, re-applied to the same or a different object.

A self-adherent wrap of the invention has numerous advantages over existing products. A significant advantage is that a self-adherent wrap of the invention does not adhere to the object to which it is applied. Another advantage is that the wrap can be applied to an object without pretreating the object. Still another advantage is that the wrap can be removed without using any release agent or without any residual adhesive remaining on the object. These advantages are significant because many of the objects for which camouflaging, treating, and/or protecting is desirable are valuable and expensive (e.g., guns, and bows), and to introduce chemicals for either or both application and removal, or for residual adhesive to remain on the object, can ruin or drastically reduce the value of such objects. Equally important are the advantages provided to the military in being able to quickly and easily change or remove wrap containing camouflage and/or other types of protective agents during military operations.

Figure 2:
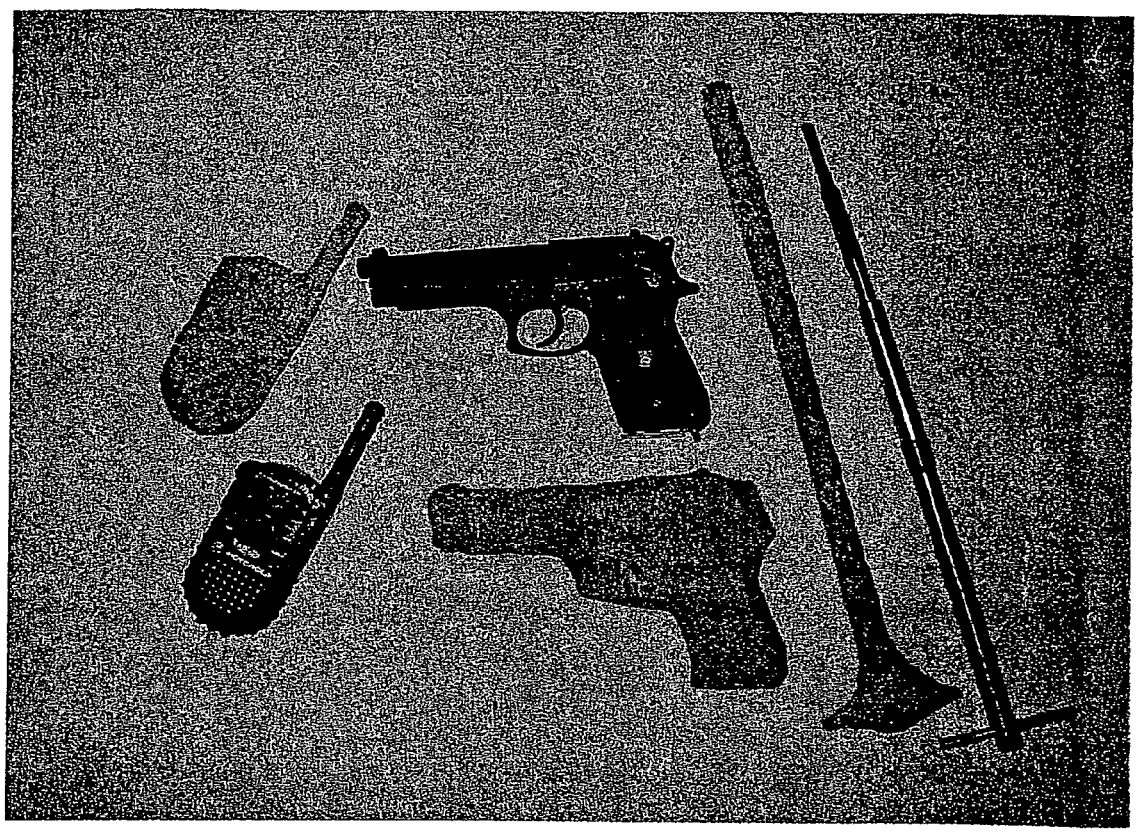
FIG. 2 shows a walkie-talkie radio, a handgun, and a chamber reamer wrapped in a self-adherent wrap of the invention.

Another advantage of a self-adherent wrap of the invention is that the flexibility and elasticity of the wrap allows wrapping of an object having essentially any size or shape, including objects that are traditionally difficult to wrap (e.g., leather or rubber materials, or very small objects). This advantage is exemplified in FIG. 1, which shows the trigger guard of a gun wrapped with a self-adherent wrap, and in FIG. 2, which shows several different items wrapped with a self-adherent wrap. Yet another advantage of a self-adherent wrap of the invention is the ability to readily change to wraps with different camouflage patterns and/or different active agents. This allows rapid transition when environments change or when the need for a camouflage pattern or active agent no longer exists (e.g., military personnel entering a civilian environment). For example, changing a camouflage pattern can involve completely changing wraps, or removing a wrap and reapplying the same wrap such that a different pattern on the opposite side is exposed. As discussed above, application and removal of a wrap of the invention is simplified due to the fact that no pretreatment or release agent is required. As indicated herein, a further advantage is that the self-adherent wrap of the invention can be reapplied (i.e., reused) to the same or a different object.

Wrapping an object with a self-adherent wrap of the invention also can reduce or eliminate noise created by the object or by an individual contacting or using the object. A self-adherent wrap of the invention also can be used for protecting objects during storage and/or shipping. In addition to camouflage patterns and/or active agents discussed above, self-adherent wraps of the invention can be printed with different colors, patterns, or identification markings. Such colors, patterns, or markings can be used for identification, inventory, or coding information during, for example, storage, shipping, and/or delivery. Further, a self-adherent wrap of the invention containing a camouflage pattern and/or an active agent (e.g., anti-bacterial compounds) can be used for bandaging purposes.

Camouflage patterns and/or active agents can be applied to either or both sides of a suitable self-adherent wrap using methods known in the art. For example, camouflage patterns and/or active agents can be stamped, rolled, printed (e.g., screen printed), or sprayed onto a suitable self-adherent wrap. A camouflage pattern and/or active agents can be applied during or after the manufacturing process of the self-adherent wrap, or can be applied to the self-adherent wrap by, for example, the end-user, after the wrap is applied to the object (see, for example, U.S. Pat. No. 4,837,056). Alternatively, the fibers used to make a self-adherent wrap can be dyed, and the camouflage pattern woven into the wrap during the manufacturing process (see, for example, U.S. Pat. No. 6,589,297). Camouflage patterns also can be three-dimensional by using printing techniques (for example, RealTree's High Definition™ printing process), by creating folds or layers in a material (see, for example, U.S. Pat. No. 5,773,101), or by adding objects such as leaves and twigs to the surface of the wrap (see, for example, U.S. Pat. No. 5,742,985). Methods for applying a camouflage pattern to a material are described in, for example, U.S. Pat. Nos. 2,351,142; 2,364,289; 4,243,709; 4,095,940, and 6,589,297.

An active agent contained on or in a wrap of the invention can be formulated such that it can be activated when desired. Activation can occur, for example, by stretching the wrap or by treating the wrap with an activation agent. An activation agent can be a compound that, for example, "turns on" the active agent, or reduces or removes an inhibitor of the active agent. The ability to activate the active agent means that the active agent is not being expended during manufacturing, shipping, storing, and retail sale.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A wrap comprising an active agent, wherein said wrap is a self-adherent wrap, wherein the active agent is selected from the group consisting of wax, grease, varnish, silicone, silica gel, a vapor phase corrosion inhibitor (VPCI), and a volatile corrosion inhibitor (VCI).

2. The wrap of claim 1, wherein said wrap does not adhere to an object to which said wrap is applied.

3. The wrap of claim 2, wherein said object is selected from the group consisting of a gun, a bow, a knife, a body part, a flashlight, a water bottle, a portion of a hunting blind or stand, boots, a backpack, a camera, a fishing rod, a fishing reel, a fishing tackle box, snow skis, snowboards, a radio, a walkie-talkie, a two-way radio, a global positioning system (GPS), and a vehicle.

4. The wrap of claim 1, wherein said active agent is applied to said wrap before said wrap is applied to an object.

5. The wrap of claim 1, wherein said active agent is applied to said wrap after said wrap has been applied to an object.

6. The wrap of claim 1, wherein said active agent is applied to one side of said wrap.

7. The wrap of claim 1, wherein said active agent is applied to both sides of said wrap.

8. The wrap of claim 1, wherein said wrap further comprises a camouflage pattern applied thereon.

9. The wrap of claim 8, wherein said camouflage pattern is selected from the group consisting of palmetto, treebark, hardwoods, hardwoods snow, timber, wetlands, mossyoak, forest floor, shadowgrass, fall foliage, breakup, mottled, and striped.

10. The wrap of claim 1, wherein said wrap is reusable.

11. A method of removably wrapping an object, comprising the step of:
providing an object; and
applying a wrap to said object, wherein said wrap is a self-adherent wrap, wherein said wrap comprises an active agent, wherein the active agent is selected from the group consisting of wax, grease, varnish, silicone, silica gel, a vapor phase corrosion inhibitor(VPCI), and a volatile corrosion inhibitor(VCI).

12. The method of claim 11, wherein said object is selected from the group consisting of a gun, a bow, a knife, a body part, a flashlight, a water bottle, a portion of a hunting blind or stand, boots, a backpack, a camera, a fishing rod, a fishing reel, a fishing tackle box, snow skis, snowboards, a radio, a walkie-talkie, a two-way radio, a global positioning system (GPS), and a vehicle.

13. The method of claim 11, wherein said wrap does not adhere to said object.

14. The method of claim 11, further comprising removing said wrap from said object.

15. The method of claim 14, further comprising reapplying said wrap to said object or to a different object.

16. A method of removably wrapping an object, comprising the step of:
providing an object; and
applying a wrap to said object, wherein said wrap is a self-adherent wrap, wherein said wrap comprises an active agent, wherein the active agent is selected from the group consisting of wax, grease, varnish, silicone, silica gel, a vapor phase corrosion inhibitor (VPCI) and a volatile corrosion inhibitor (VCI), wherein said applying does not require Pretreatment of said object.

17. The method of claim 16, further comprising:
removing said wrap, wherein removal of said wrap from said object does not require use of a release agent.

18. A method of making a wrap comprising an active agent, said method comprises the steps of:
providing a wrap, wherein said wrap is a self-adherent wrap; and
applying an active agent thereon, wherein said active agent is selected from the group consisting of wax, grease, varnish, silicone, silica gel, a vapor phase corrosion inhibitor (VPCI), and a volatile corrosion inhibitor (VCI)

19. The method of claim 18, wherein said applying is performed by a manufacturer of said wrap.

20. The method of claim 18, wherein said applying is performed by an end-user of said wrap.

21. The method of claim 18, wherein said active agent is applied on the surface of said wrap.

22. The method of claim 18, wherein said active agent is applied by impregnating said wrap with said active agent.

23. The method of claim 18, wherein said active agent is applied to said wrap in layers.

* * * * *